(12) United States Patent
Kim et al.

(10) Patent No.: US 12,176,938 B2
(45) Date of Patent: Dec. 24, 2024

(54) EXTERIOR COVER FOR ELECTRONIC DEVICE

(71) Applicant: Samsung Electronics Co., Ltd., Gyeonggi-do (KR)

(72) Inventors: Chungha Kim, Gyeonggi-do (KR); Hyunkeun Son, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 392 days.

(21) Appl. No.: 17/675,366

(22) Filed: Feb. 18, 2022

(65) Prior Publication Data
US 2022/0271788 A1   Aug. 25, 2022

Related U.S. Application Data

(63) Continuation of application No. PCT/KR2022/002447, filed on Feb. 18, 2022.

(30) Foreign Application Priority Data

Feb. 19, 2021 (KR) .................. 10-2021-0022590

(51) Int. Cl.
H04M 1/04 (2006.01)
A45C 11/00 (2006.01)
H04B 1/3888 (2015.01)
H04M 1/18 (2006.01)
H04M 1/38 (2006.01)

(52) U.S. Cl.
CPC ............ *H04B 1/3888* (2013.01); *H04M 1/04* (2013.01)

(58) Field of Classification Search
None
See application file for complete search history.

(56) References Cited

U.S. PATENT DOCUMENTS

| 9,913,388 | B1 * | 3/2018 | McHatet | H04B 1/3888 |
| 10,784,914 | B1 | 9/2020 | Kim | |
| 10,969,825 | B2 * | 4/2021 | Lo | G06F 1/1632 |
| 2011/0113437 | A1 * | 5/2011 | Day | G11B 33/0427 340/568.1 |

(Continued)

FOREIGN PATENT DOCUMENTS

| CN | 205681490 | 11/2016 |
| CN | 206181158 | 5/2017 |

(Continued)

OTHER PUBLICATIONS

International Search Report dated Jun. 7, 2022 issued in counterpart application No. PCT/KR2022/002447, 9 pages.

*Primary Examiner* — Pablo N Tran
(74) *Attorney, Agent, or Firm* — The Farrell Law Firm, P.C.

(57) ABSTRACT

An exterior cover of an electronic device is provided. the exterior cover includes a cover portion including a front surface facing in a first direction, a rear surface facing in a second direction opposite to the first direction, and a recess formed on the rear surface; and a support member having a shape corresponding to the recess and including a magnetic material accommodated therein to be detachably provided on the rear surface of the cover portion. The cover portion includes at least one metallic member disposed inside thereof, and the at least one metallic member at least partially overlaps the recess.

20 Claims, 15 Drawing Sheets

(56) References Cited

U.S. PATENT DOCUMENTS

| | | | |
|---|---|---|---|
| 2013/0220841 A1* | 8/2013 | Yang | B63C 11/02 |
| | | | 206/37 |
| 2016/0020810 A1* | 1/2016 | Platt | H04B 1/3888 |
| | | | 455/575.8 |
| 2018/0184773 A1* | 7/2018 | Whitten | B60R 11/0241 |
| 2019/0223591 A1 | 7/2019 | Sayed | |
| 2019/0394894 A1 | 12/2019 | Kim | |
| 2020/0127694 A1* | 4/2020 | Lim | H04B 1/3877 |
| 2020/0214408 A1 | 7/2020 | Shin | |

FOREIGN PATENT DOCUMENTS

| | | |
|---|---|---|
| KR | 1020130003784 | 6/2013 |
| KR | 10-2016-0017878 | 2/2016 |
| KR | 10-2017-0086428 | 7/2017 |
| KR | 1020170003088 | 9/2017 |
| KR | 1020180077981 | 7/2018 |
| KR | 1020190011933 | 2/2019 |
| KR | 20-0490616 | 12/2019 |
| WO | WO 2019/245330 | 12/2019 |

* cited by examiner

EXTERIOR COVER FOR ELECTRONIC DEVICE

CROSS-REFERENCE TO RELATED APPLICATIONS

This application is a Bypass Continuation Application of International Application No. PCT/KR2022/002447, which was filed on Feb. 18, 2022, and is based on and claims priority under 35 U.S.C. § 119 to Korean Patent Application No. 10-2021-0022590, which was filed in the Korean Intellectual Property Office on Feb. 19, 2021, the entire disclosure of each of which is incorporated herein by reference.

BACKGROUND

1. Field

The disclosure relates generally to an exterior cover for an electronic device.

2. Description of Related Art

Various types of electronic devices, such as mobile phones, tablet personal computers (tablet PCs), Moving Picture Experts Group Layer-3 (MP3) players, portable multimedia players (PMP), and electronic books, are being used, and users may access various content by using such electronic devices. A wireless transmission/reception function, a multimedia function (e.g., picture/music/video playback), and an entertainment function (e.g., gaming) are integrated into electronic devices. Mobile communication services have been extended to multimedia service areas, thereby enabling users to use not only voice communication or text messaging, but also multimedia services through electronic devices.

Electronic devices are made thin and light to be conveniently carried. Such electronic devices may be used together with a case surrounding the exterior of the electronic device (hereinafter, referred to as an "exterior cover") because there is a possibility that the electronic device may be damaged by external physical impacts. The exterior cover surrounding the electronic device may not only provide a function of simply protecting the electronic device, but may also induce an aesthetic appeal to the user.

Accessories may be used to conveniently hold electronic devices. For example, holding devices that can be attached to rear surfaces or exterior covers of electronic devices are commonly referred to as smart toks, grip toks, smart rings, or finger rings.

However, the above-mentioned holding devices are mostly attached to rear surfaces or exterior covers of electronic devices by using disposable adhesives, thereby posing a problem in that they are not easily detached when wirelessly charging electronic devices or when cradled on vehicle cradles, and even when detached, it is difficult to reattach them.

In addition, the holding devices are configured solely to easily hold electronic devices or exterior covers, and may not have structures for easily cradling electronic devices or exterior covers when the holding devices are attached. Further, once attached to electronic devices or exterior covers, the holding devices have fixed position and use ranges, making it difficult to variously set the cradling angle.

SUMMARY

The disclosure has been made to address at least the above-mentioned problems and/or disadvantages and to provide at least the advantages described below.

An aspect of the disclosure is to provide a support member that can be freely attached to/detached from a cover portion as a cradling device capable of cradling an exterior cover at various angles.

Another aspect of the disclosure is to provide a support member having an invisible hinge structure to an exterior cover coupled to an electronic device, such that an aesthetic appeal may be induced.

Another aspect of the disclosure is to provide an exterior cover which is coupled to the electronic device and may be capable of implementing multiple cradling modes, thereby improving user convenience.

Another aspect of the disclosure is to provide a support member coupled to the rear surface of an exterior cover, which may support the exterior cover at various angles, such that the electronic device may be stably cradled in the corresponding direction.

According to an aspect of the disclosure, an electronic device exterior cover includes a cover portion including a front surface facing in a first direction, a rear surface facing in a second direction opposite to the first direction, and a recess formed on the rear surface; and a support member having a shape corresponding to the recess and including a magnetic material accommodated therein to be detachably provided on the rear surface of the cover portion. The cover portion includes at least one metallic member disposed inside thereof, and the at least one metallic member at least partially overlaps the recess.

According to another aspect of the disclosure, an electronic device exterior cover includes a cover portion including a recess formed in at least a portion of a surface thereof and a metallic member disposed to at least partially overlap the recess; and a support member including at least one magnetic material therein to be detachably provided on the rear surface of the cover portion. The recess includes a first recess; a third recess extending from one end of the first recess and at least partially perpendicular to the first recess; and a fourth recess extending from the other end of the first recess and facing in a direction at least partially parallel to the third recess. The support member further includes a first portion; a third portion extending from one end of the first portion and at least partially perpendicular to the first portion; and a fourth portion extending from the other end of the first portion and at least partially parallel to the third portion. The support member is configured to have a shape corresponding to the recess.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
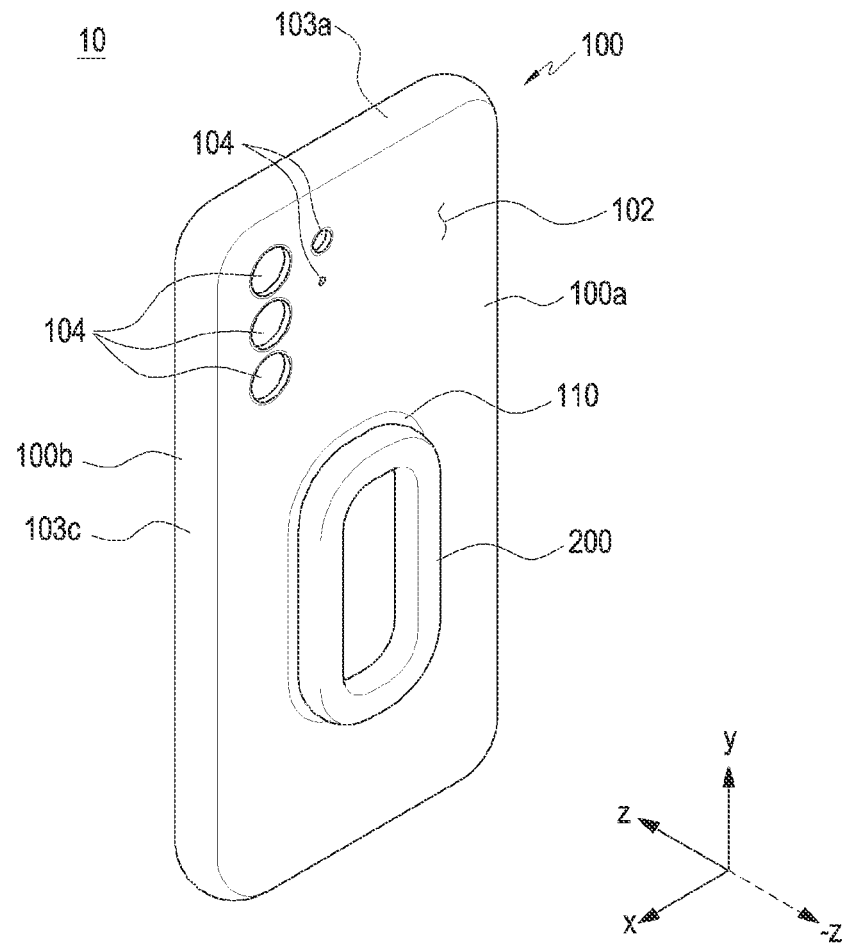
FIG. 1 is a perspective view of an exterior cover, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made.

With regard to the description of the drawings, similar reference numerals may be used to designate similar or relevant elements. As used herein, the expression "have", "may have", "include", or "may include" refers to the existence of a corresponding feature (e.g., a numeral, a function, an operation, or a constituent element such as a component) and does not exclude the existence of additional features.

As used herein, the expressions "a first", "a second", "the first", "the second", and the like may modify various elements regardless of the order and/or the importance thereof, and do not limit the corresponding elements. For example, a first user device and a second user device may indicate different user devices regardless of the order and/or the importance thereof. In addition, a first element may be termed a second element, and similarly, a second element may be termed a first element without departing from the scope of protection of the disclosure.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to".

The terms used in the disclosure are only used to describe specific embodiments, and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

The disclosure provides various embodiments regarding an electronic device exterior cover configured to stably cradle the electronic device at various angles.

The disclosure provides various embodiments regarding an exterior cover configured to provide a cradling device configured such that, during wireless charging of an electronic device, or when cradled on a vehicle cradle, the same can be easily detached and freely reattached.

The disclosure provides various embodiments regarding a support member that can be freely attached to/detached from a cover portion as a cradling device capable of cradling an exterior cover at various angles.

Various embodiments of the disclosure are advantageous in that, by providing a support member having an invisible hinge structure to an exterior cover coupled to an electronic device, an aesthetic appeal may be induced.

The disclosure provides various embodiments regarding an exterior cover which is always coupled to the electronic device and used together in most cases, and which may be endowed with a function capable of implementing multiple cradling modes, thereby improving user convenience.

Various embodiments of the disclosure are advantageous in that a support member coupled to the rear surface of an exterior cover may support the exterior cover at various angles, and the electronic device may be stably cradled in the corresponding direction.

Figure 2A:
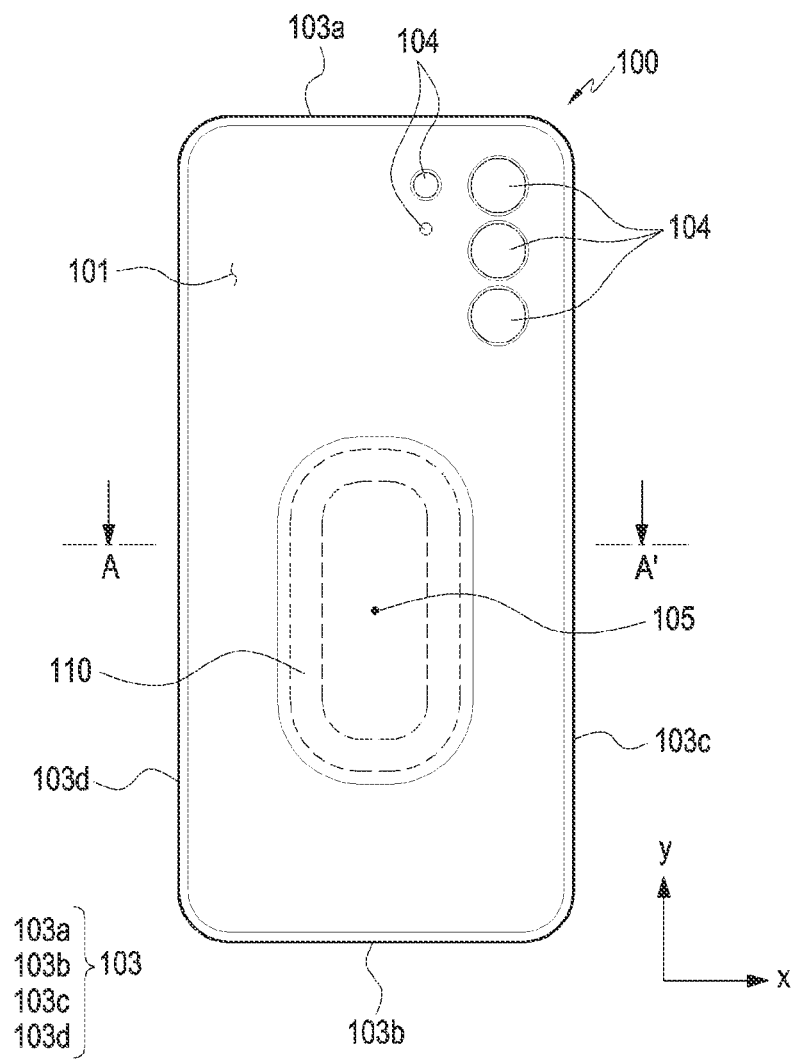
FIG. 2A illustrates a front surface of an exterior cover, according to an embodiment.
Figure 2B:
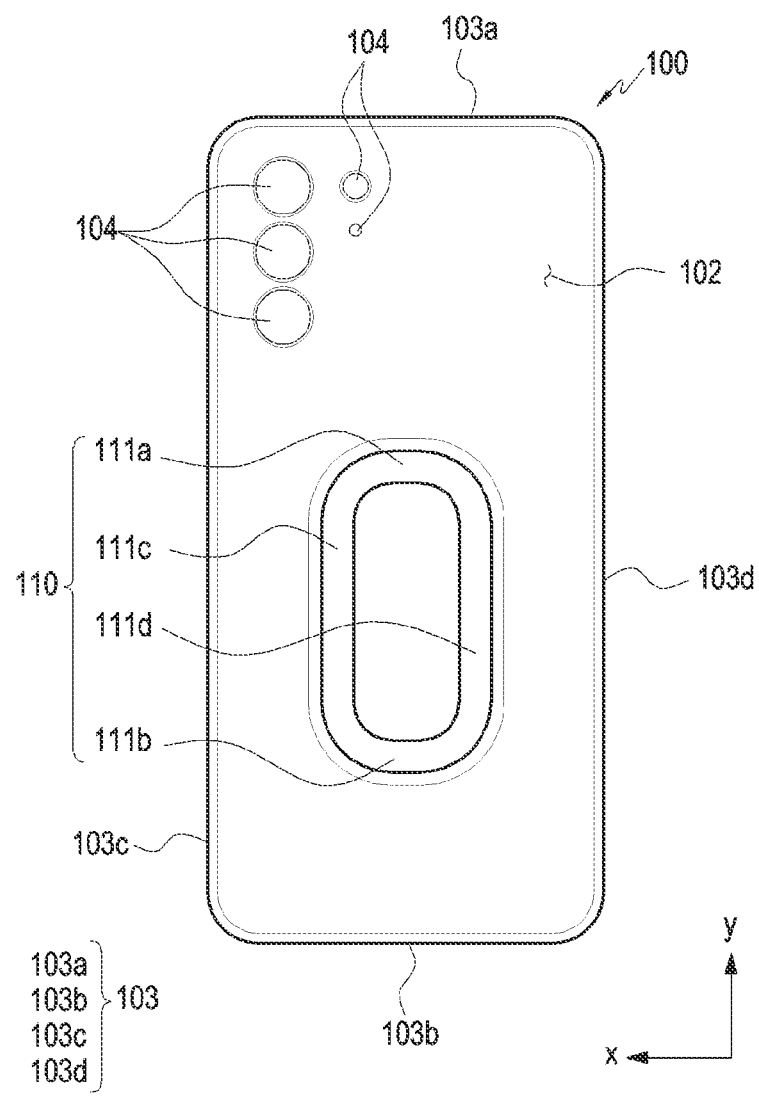
FIG. 2B illustrates a rear surface of an exterior cover, according to an embodiment.

FIG. 1 is a perspective view of an exterior cover, according to an embodiment. FIG. 2A illustrates the front surface of the exterior cover, according to an embodiment. FIG. 2B illustrates the rear surface of the exterior cover, according to according to an embodiment.

Referring to FIGS. 1, 2A, and 2B, the exterior cover 10 may include a cover portion 100 surrounding at least a portion of an electronic device, and a support member 200 detachable to the cover portion 100.

The cover portion 100 may protect the electronic device from external impact (e.g., chemical or physical impact) and may provide various colors and textures to the exterior of the electronic device, thereby providing an aesthetically pleasing sense to a user. Various types of electronic devices may be mounted on the cover portion 100. The electronic device may include, for example, at least one of a portable communication device (e.g., a smartphone), a tablet PC, a mobile phone, a video phone, an e-book reader, a desktop PC, a laptop PC, a netbook computer, a workstation, a server, a personal digital assistant (PDA), a PMP, an MP3 player, a mobile medical device, a camera, and a wearable device. The electronic device mounted on the cover portion 100 may include all electronic devices that are generally portable by a user or that can be cradled at various angles with respect to the ground.

The cover portion 100 may be an accessory cover provided separately from a housing of the electronic device. However, the disclosure is not necessarily limited thereto, and the cover portion 100 may correspond to a portion of a housing of the electronic device, for example, at least a portion of a rear plate of the electronic device. The cover portion 100 may be formed of, for example, glass, ceramic, a polymer, a metal (e.g., aluminum, stainless steel (STS), or magnesium), or a combination of at least two of the above materials. In addition, the cover portion 100 may be formed of at least one of silicone, urethane, rubber, leather, and fiber or a combination of at least two or more thereof in order to protect the inside of the electronic device from external impact or to prevent scratches on the outside of the electronic device.

The cover portion 100 may include a plate 100a having a front surface 101 facing in a first direction and a rear surface 102 facing in a second direction opposite to the first direction and may further include a side member 100b extending from the edge of the plate 100a. The front surface 101 of the cover portion 100 may be a part that at least partially faces one surface of the electronic device (e.g., the rear surface of the electronic device). For reference, with respect to the direction components shown in FIGS. 1, 2A, and 2B and drawings to be described later, the direction components X, Y, and Z may refer to reference directions corresponding to the Cartesian coordinate system in space.

A first direction (hereinafter referred to as a "Z-axis direction") in which the front surface 101 of the cover portion 100 faces may be a direction parallel to a direction in which the direction component Z is directed, and a second direction (hereinafter referred to as a "−Z-axis direction") in which the rear surface 102 of the cover portion 100 faces may be a direction parallel to a direction opposite to the direction in which the direction component Z is directed. Additionally, the direction component X (hereinafter referred to as "X-axis direction") may correspond to the width direction of the cover portion 100, and the direction component Y (hereinafter referred to as "Y-axis direction") may correspond to the longitudinal direction of the cover portion 100.

The support member 200 may be detachably provided on the cover portion 100. For example, when the support member 200 is removed from the cover portion 100, the cover portion 100 may be configured to be easily cradled on an external structure without the support member 200. On the other hand, when the support member 200 is attached to the cover portion 100, the cover portion 100 may be inclined by a predetermined angle with respect to the ground by using the support member 200.

The support member 200 may be attached to one surface of the cover portion 100, for example, the support member 200 may be attached to the rear surface 102 of the plate 100a and may be detached from the rear surface 102 of the plate 100a while being attached thereto. In addition, the support member 200 may be attached in various forms to various positions of the rear surface 102 of the cover unit 100. For example, the support member 200 may be attached to the rear surface 102 of the cover portion 100 in a state in which the same is parallel to the plate 100a, as shown in FIG. 1. Additionally, the support member 200 may be attached to the rear surface 102 of the cover portion 100 in a state in which the same is perpendicular to the plate 100a. In addition, the support member 200 may be attached to the rear surface 102 of the exterior cover 10 in a state in which the same is inclined at a predetermined angle with respect to the plate 100a. The support member 200 may be attached in various forms to various positions of the rear surface 102 of the cover portion 100, the exterior cover 10 (or an electronic device) to form various inclinations with respect to the ground.

The side member 100b may form the side surface 103 of the cover portion 100, and the side surface 103 may be a portion that at least partially surrounds one surface (e.g., a side surface) of the electronic device. The side surface 103 may extend perpendicularly to the front surface 101 and the rear surface 102. The side surface 103 may be formed to protrude in the first direction from the edge of the front surface 101 by a predetermined height. The direction in which the side surface 103 faces may include a direction parallel to the X-axis or the Y-axis in the direction components. The side surface 103 may include a first side surface portion 103a facing in a direction parallel to the Y-axis, a second side surface portion 103b facing in a direction opposite to the Y-axis, a third side surface portion 103c facing in a direction parallel to the X-axis, and a fourth side surface portion 103d facing in a direction opposite to the X-axis. However, the disclosure is not necessarily limited thereto, and at least one of the first side surface portion 103a, the second side surface portion 103b, the third side surface portion 103c, and the fourth side surface portion 103d may be omitted from the side member 100b.

Figure 7:
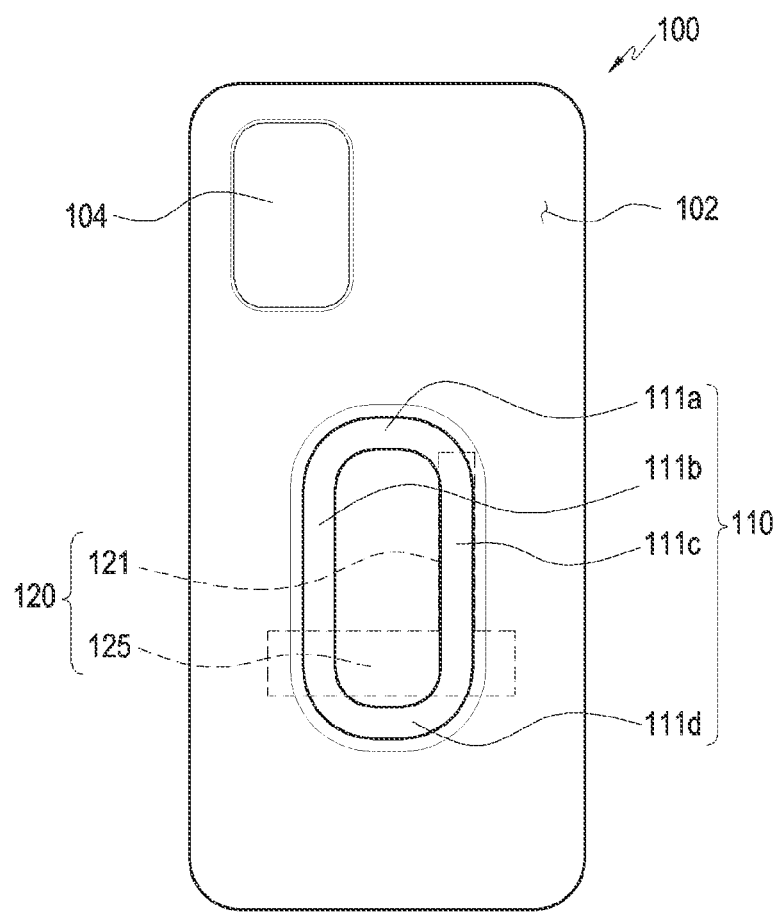
FIG. 7 illustrates a rear surface of an exterior cover including a metallic member, according to an embodiment.

Openings 104 may be formed through the cover portion 100. The openings 104 may be aligned with at least one of an audio module, a sensor module, a light emitting element, and a camera module of the electronic device. The number of the openings 104 and the location and/or shape of the openings 104 may vary according to embodiments. For example, the embodiment of FIG. 1 shows that five openings 104 are formed through the upper end of one side of the cover portion 100. On the other hand, the embodiment of FIG. 7 shows that one opening 104 is formed through the upper end of one side of the cover portion 100.

At least one recess 110 may be formed in the rear surface 102 of the cover portion 100. The recess 110 may be disposed at any position on the rear surface 102 of the cover portion 100. As shown in FIGS. 2A and 2B, the recess 110 may be formed such that the center 105 of the recess 110 is placed at a position slightly biased to one side from the center of the rear surface 102 of the cover portion 100 (See line A-A' through the center of the rear surface 102). The recess 110 may be recessed from the plate 100a in the first direction and may correspond to a groove and/or sink structure forming a predetermined depth unlike other portions on the plate 100a. The recess 110 may include a first recess 111a extending in the longitudinal direction (e.g., the Y-axis direction) of the cover portion 100, a second recess 111b spaced apart from the first recess 111a and facing in a direction at least partially parallel to the first recess 111a, a third recess 111c extending from one end of the first recess 111a and at least partially perpendicular to the first recess 111a, and a fourth recess 111d extending from the other end of the first recess 111a and facing in a direction at least partially parallel to the third recess 111c. The recess 110 may have a closed loop shape formed by the first recess 111a, the second recess 111b, the third recess 111c, and the fourth recess 111d extending from one another. The recess 110 may include the first recess 111a, the second recess 111b, the third recess 111c, and the fourth recess 111d to have an "O" shape with rounded corners. However, the disclosure is not necessarily limited thereto, and the recess 110 may have a rectangular shape with angled corners or a shape similar to a rectangular shape.

The recess 110 may be configured without at least one of the first recess 111*a*, the second recess 111*b*, the third recess 111*c*, and the fourth recess 111*d*. For example, the recess 110 may be configured without at least one of the first recess 111*a*, the second recess 111*b*, the third recess 111*c*, and the fourth recess 111*d* to have an opened loop shape. In addition, the recess 110 may include the first recess 111*a*, the third recess 111*c*, and the fourth recess 111*d* to form a "U" shape. However, the disclosure is not necessarily limited thereto, and the position and shape of the recess 110 may vary according to embodiments.

Figure 3:
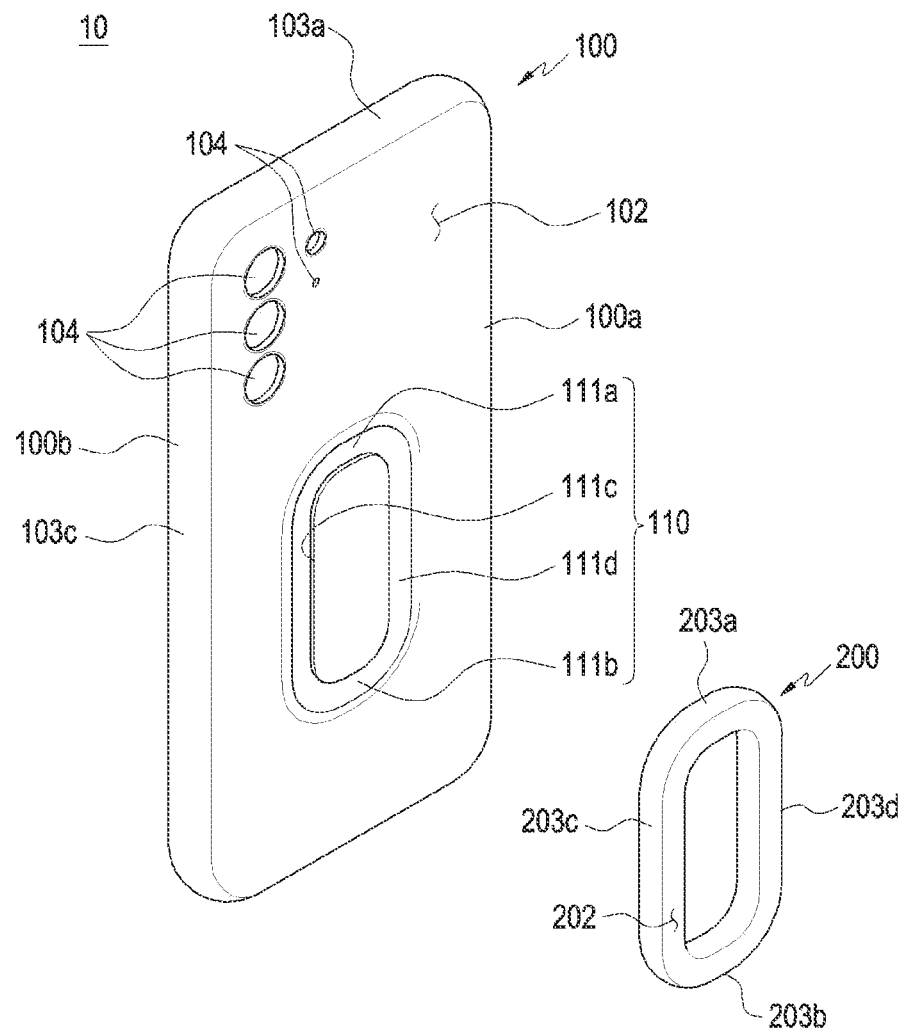
FIG. 3 is a perspective view of an exterior cover from which a support member is separated, according to an embodiment.
Figure 4A:
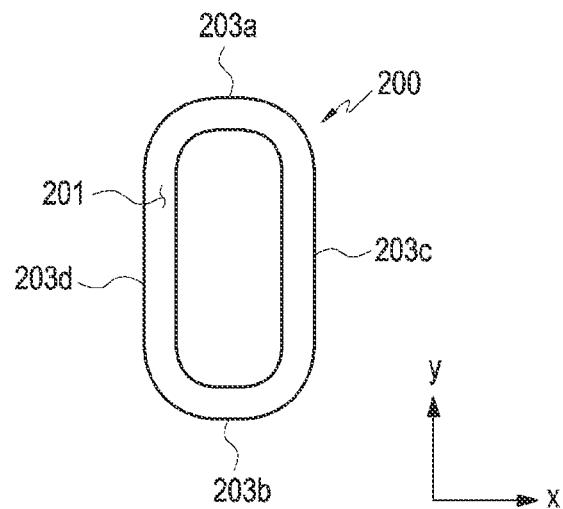
FIG. 4A illustrates a support member, according to an embodiment.
Figure 4B:
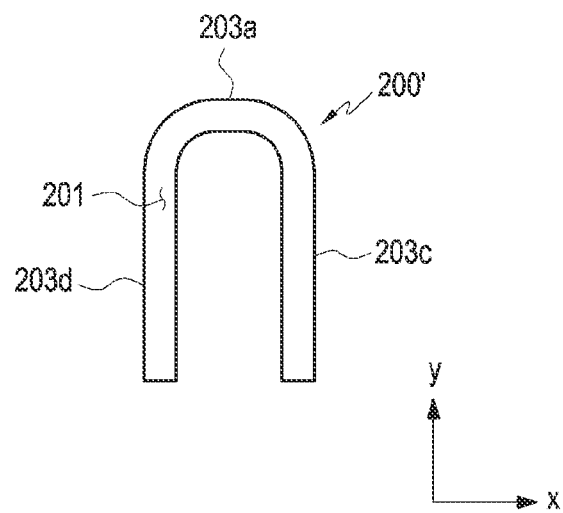
FIG. 4B illustrates a support member, according to an embodiment.

FIG. 3 is a perspective view of the exterior cover from which the support member is separated, according to an embodiment. FIG. 4A illustrates the support member, according to an embodiment. FIG. 4B illustrates the support member, according to an embodiment.

Referring to FIGS. 3, 4A, and 4B, the support member 200 may be attached to the recess 110 formed in the rear surface 102 of the cover portion 100. The support member 200 may include a first surface 201 and a second surface 202 facing opposite to the first surface 201. The support member 200 may include a first portion 203*a*, a second portion 203*b* at least partially parallel to the first portion 203*a*, a third portion 203*c* extending from one end of the first portion 203*a* and at least partially perpendicular to the first portion 203*a*, and a fourth portion 203*d* extending from the other end of the first portion 203*a* and at least partially parallel to the third portion 203*c*.

The support member 200 may have a shape corresponding to the recess 110. When the recess 110 has a closed loop shape formed by the first recess 111*a*, the second recess 111*b*, the third recess 111*c*, and the fourth recess 111*d* extending from one another, the support member 200 corresponding to the recess 110 may also have a closed loop shape formed by the first portion 203*a*, the second portion 203*b*, the third portion 203*c*, and the fourth portion 203*d* extending from one another. In addition, when the recess 110 has an opened loop shape including the first recess 111*a*, the third recess 111*c*, and the fourth recess 111*d*, the support member 200' may have an opened loop shape including the first portion 203*a*, the third portion 203*c*, and the fourth portion 203*d*. That is, when the recess 110 has an "O" shape, the support member 200 may also be formed in an "O" shape, and when the recess 110 has a "U" shape, the support member 200' may also be formed in a "U" shape. The support member 200 may be formed to have a perforated middle portion when the support member 200 has a closed loop shape formed by the first portion 203*a*, the second portion 203*b*, the third portion 203*c*, and the fourth portion 203*d* extending from one another as well as when the support member 200 has an opened loop shape including the first recess 111*a*, the third recess 111*c*, and the fourth recess 111*d*.

At least a portion of the support member may have a shape different from that of the recess 110. For example, when the recess 110 has an "O" shape as shown in FIG. 3, the support member may be formed in a "U" shape as shown in FIG. 4B. Both the support member 200 according to the embodiment shown in FIG. 4A and the support member 200' according to the embodiment shown in FIG. 4B may have a shape attachable to the recess 110 and may be formed to be compatible with each other. For example, the support member 200' shown in FIG. 4B may be used instead of the support member 200 shown in FIG. 4A, or the supporting member 200 shown in FIG. 4A may be used instead of the support member 200' shown in FIG. 4B.

Figure 5:
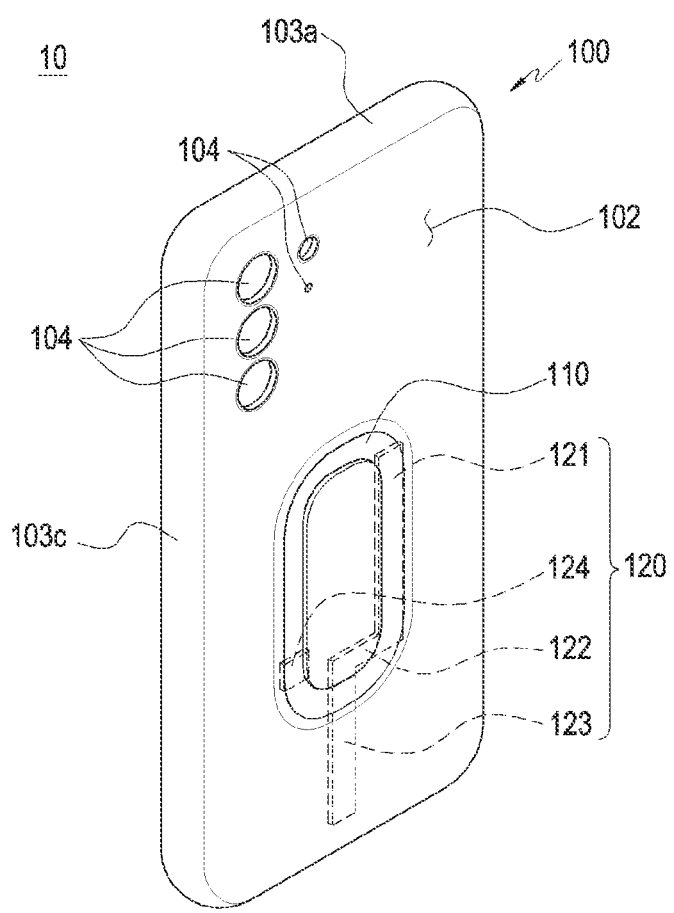
FIG. 5 is a perspective view of an exterior cover including a metallic member, according to an embodiment.
Figure 6:
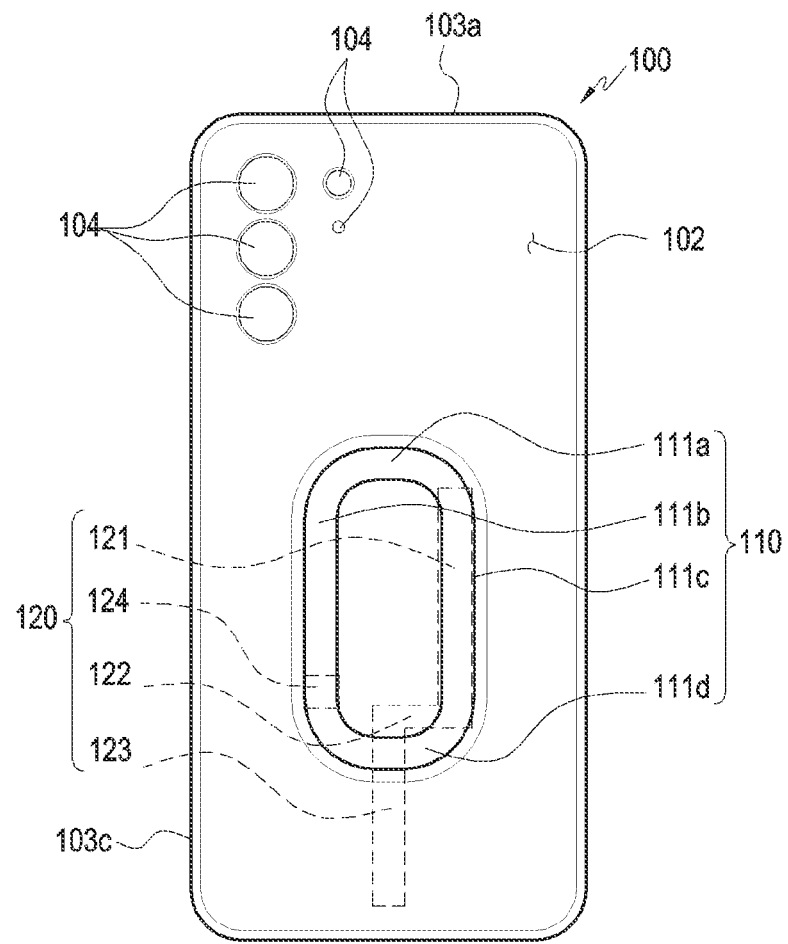
FIG. 6 illustrates a rear surface of an exterior cover including a metallic member, according to an embodiment.

FIG. 5 is a perspective view of the exterior cover including a metallic member, according to an embodiment. FIG. 6 illustrates the rear surface of the exterior cover including a metallic member, according to an embodiment. FIG. 7 illustrates the rear surface of the exterior cover including a metallic member, according to an embodiment.

Referring to FIGS. 5 and 6, the cover portion 100 may include a metallic member 120. The metallic member 120 may include, for example, a ferromagnetic material such as one of iron, nickel, cobalt, or an alloy thereof. The metallic member 120 may be configured such that the support member 200 having a magnetic force can be attached to the cover portion 100. The metallic member 120 may be elongated to have at least one bending portion. The "bending portion" may refer to a portion of an element at which a direction is changed when the element includes a portion elongated in one direction and a portion elongated in another direction. The metallic member 120 may include a first elongated portion 121 extending in the longitudinal direction (or a third direction (e.g., the y-direction in FIG. 1)) of the cover portion 100. In addition, the metallic member 120 may include a second elongated portion 123 spaced apart from the first elongated portion 121 by a predetermined distance and extending in a direction parallel to the first elongated portion. In this case, the first elongated portion 121 may be provided such that the support member 200 having a magnetic force is available for various postures at a first position, and the second elongated portion 123 may be provided such that the support member 200 having a magnetic force is available for various postures at a second position.

The metallic member may further include a bridge 122 connecting the first elongated portion 121 and the second elongated portion 123 in addition to the first elongated portion 121 and the second elongated portion 123. The first elongated portion 121, the second elongated portion 123, and the bridge 122 may be collectively referred to as a first metallic member. The metallic member in the cover portion 100 having a limited thickness can secure a wider area by integrally connecting the first elongated portion 121 and the second elongated portion 123 using the bridge 122.

The metallic member 120 may further include a second metallic member 124 formed to be spaced apart from the first metallic member. The second metallic member 124 may be formed in a patch type. The second metallic member 124 may be formed in a metallic island structure at a position at which the same is spaced apart from the first metallic member, unlike the elongated first metallic member in which the first elongated portion 121, the second elongated portion 123, and the bridge 122 are integrally formed. Here, the second metallic member 124 may be provided to be maintained in a state in which the same is attached in parallel to the plate 100*a* at the first position.

The metallic member 120 may be disposed to at least partially overlap the recess 110. The metallic member 120 may include a portion having an identical or at least similar shape and width to the recess 110. As shown in FIGS. 5 and 6, the first elongated portion 121 of the metallic member 120 may be elongated in the longitudinal direction (e.g., the Y-axis direction) of the fourth recess 111*d* such that a significant portion thereof is formed to substantially overlap the fourth recess 111*d*. In addition, when the support member 200 including a magnetic material (which will be described later with reference to the embodiment of FIG. 8) is attached to the fourth recess 111*d*, the first elongated portion 121 may have an identical width to the fourth recess 111d. As the first elongated portion 121 overlaps the fourth recess 111d and has an identical width thereto, the support member 200 may not deviate from a designated position. In addition, the bridge 122 and the second elongated portion 123 of the metallic member 120 may be formed to at least partially overlap the second recess 111b or the fourth recess 111d. According to the embodiments shown in FIGS. 5 and 6, the bridge 122 may extend in a direction perpendicular to the longitudinal direction of the fourth recess 111d from the end of the first elongated portion 121 overlapping the fourth recess 111d, and the second elongated portion 123 may extend from the end of the bridge 122 in the longitudinal direction (e.g., the Y-axis direction) of the fourth recess 111d to cross the second recess 111b. The patch-type second metallic member 124 may be disposed on the third recess 111c spaced apart from the fourth recess 111d. The second metallic member 124 may be disposed on an end side of the third recess 111c.

Referring to FIG. 7, the cover portion 100 may include a metallic member 120 different from that of the embodiment shown in FIGS. 5 and 6. The metallic member 120 may include a first elongated portion 121 extending in the longitudinal direction of the cover portion 100, and a third elongated portion 125 extending vertically from one end of the first elongated portion 121. The third elongated portion 125 may have a longer length and a wider width than the bridge 122. Here, the first elongated portion 121 may be provided such that the support member 200 having a magnetic force is available for various postures at the first position, and the third elongated portion 123 may be provided such that the support member 200 having a magnetic force is available for various postures at a third position.

Positioning and various postures of the support member 200, shown in FIGS. 5 to 7, will be described in more detail below with reference to the embodiments of FIGS. 12 to 15.

Figure 8:
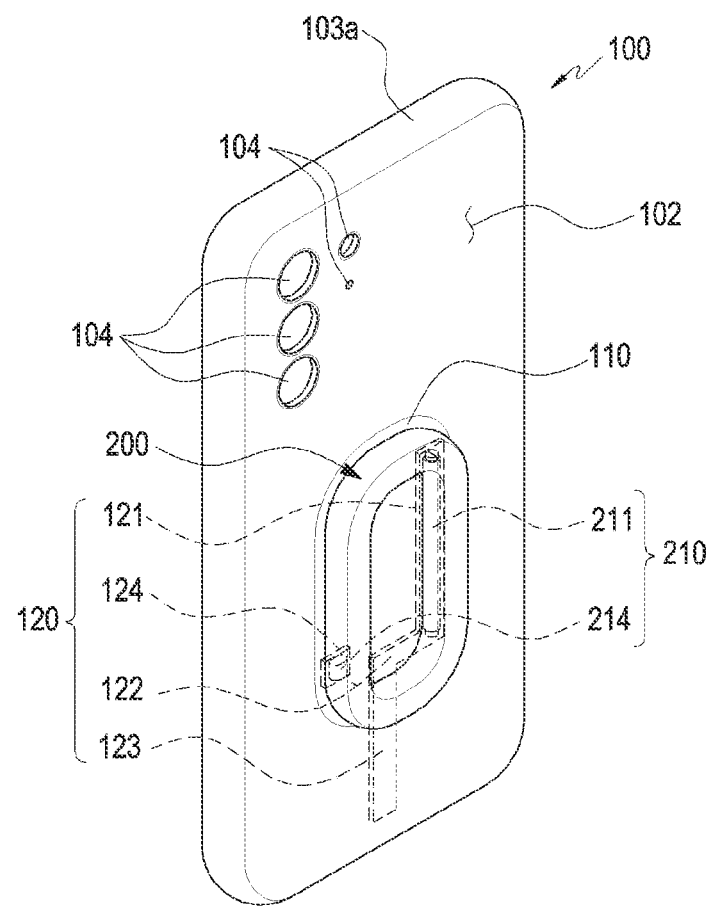
FIG. 8 is a perspective view illustrating a cover portion to which a support member including at least one magnetic material is attached, according to an embodiment.
Figure 9:
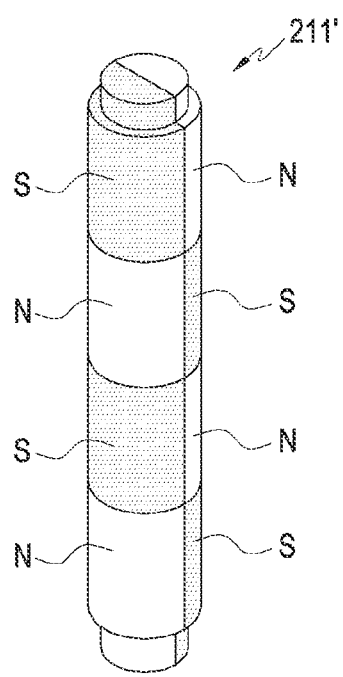
FIG. 9 is a perspective view illustrating a magnetic material accommodated in a support member, according to an embodiment.

FIG. 8 is a perspective view illustrating the cover portion to which the support member including at least one magnetic material is attached, according to an embodiment. FIG. 9 is a perspective view illustrating the magnetic material accommodated in the support member, according to an embodiment.

Referring to FIG. 8, the support member 200 may include a magnetic material 210 including a magnetized metal. The magnetic material 210 may be a permanent magnet in which a magnetic moment inside a transition metal is constantly maintained by magnetizing a transition metal such as iron, nickel, or cobalt or a rare earth material such as neodymium or gadolinium. Unlike the non-magnetized metallic member 120 provided in the cover portion 100 of the magnetic material 210, the magnetized metal may have a magnetized N pole and S pole.

At least one magnetic material 210 may be accommodated in the support member 200. The magnetic material 210 may be accommodated in at least a portion of the support member 200, for example, the third portion 203c or the fourth portion 203d of the support member 200. The plurality of magnetic materials 210 may be provided and may be accommodated in a plurality of positions of the support member 200. The magnetic materials 210 may include a first magnetic material 211 and a second magnetic material 214, and the first magnetic material 211 may be disposed on the third portion 203c and the second magnetic material 214 may be disposed on the fourth portion 203d.

At least a portion of the magnetic material 210 may be provided at a position corresponding to the metallic member 120 of the cover portion 100. The support member 200 may include a first magnetic material 211 provided at a position corresponding to the first elongated portion 121 of the metallic member 120 and a second magnetic material 214 provided at a position corresponding to the second metallic member 124. Further, the first magnetic material 211 and the second magnetic material 214 may be formed to have the same length and/or width of the first elongated portion 121 and the second metallic member 124, respectively. Accordingly, when the support member 200 having the magnetic material 210 is attached to the recess 110 while being parallel to the plate 100a, the first magnetic material 211 and the second magnetic material 214 may overlap with the first elongated portion 121 of the first metallic member and the second metallic member 124, respectively. As the first magnetic material 211 and the second magnetic material 214 overlap the first elongated portion 121 of the first metallic member and the second metallic member 124, respectively, the supporting member 200 may be stably attached to the cover portion 100. The first magnetic material 211 overlapping with the first elongated portion 121 of the first metallic member may be narrow and long, having a rod shape or a cylindrical shape. In addition, the second magnetic material 124 overlapping with the second metallic member 124 may be a patch-type or circular shaped magnet.

The magnetic material 210 may include at least a portion of the magnetic material magnetized in a pattern of a designated shape. For example, as shown in FIG. 9, the magnetic material 210 may include a first magnetic material 211' that is multipolar magnetized along the longitudinal direction. Here, the multipolar magnetization may refer to the case where the N pole and the S pole are alternately magnetized in one direction in one magnetic material. According to the embodiment shown in FIG. 9, the first magnetic material 211' is implemented as a magnetic material in which the N pole and the S pole are alternately magnetized four or more times in the longitudinal direction. When the multipolar magnetized material is provided as described above, the density of the magnetic force flux formed in a region adjacent to the magnetic material may be higher than that of a single dipole magnetized material, thereby providing a stronger magnetic force. That is, according to an embodiment of the disclosure, the attachment force of the support member 200 to the cover portion 100 may be further increased by providing a magnetic material having a multipolar magnetization.

Figure 10:
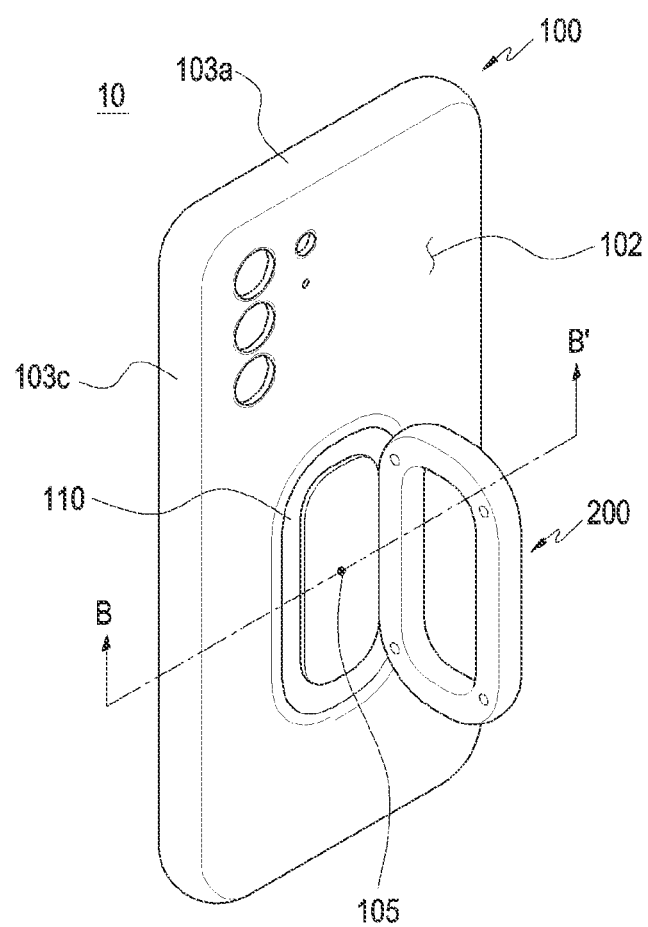
FIG. 10 is a perspective view illustrating a cover portion having a support member attached thereto, according to an embodiment.
Figure 11A:
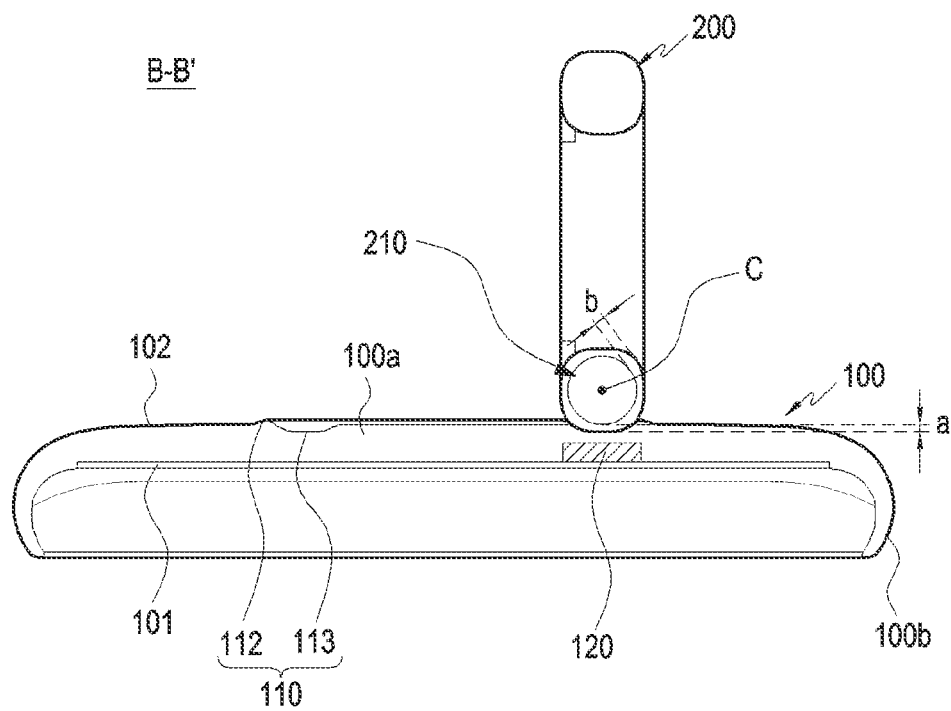
FIG. 11A illustrates a cross-section of a cover portion having a support member attached thereto, according to an embodiment.
Figure 11B:
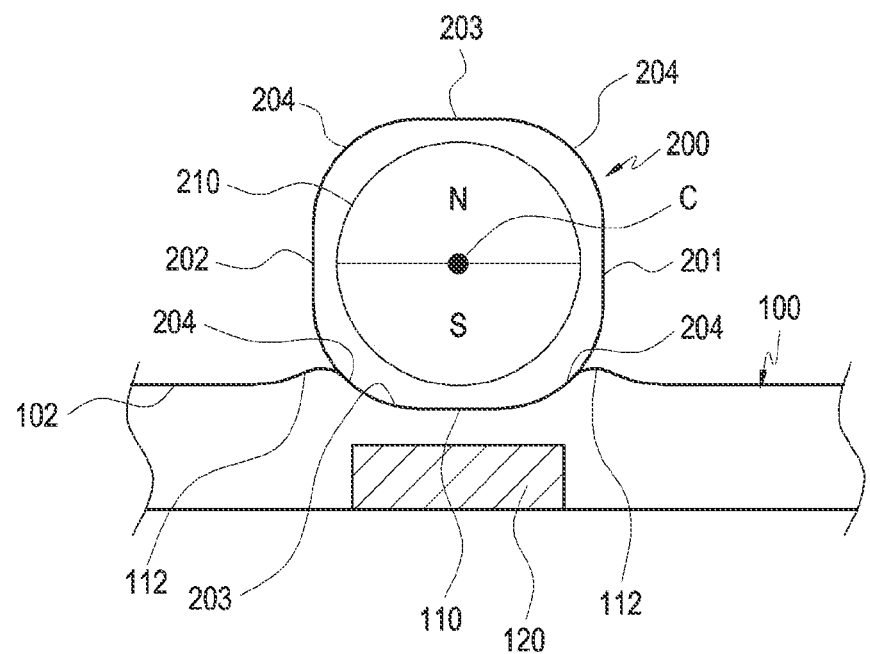
FIG. 11B is an enlarged view of a portion where a support member is attached to a recess, according to an embodiment.

FIG. 10 is a perspective view illustrating the cover portion 100 to which the support member 200 is attached, according to an embodiment. FIG. 11A is a cross-section of the cover portion 100 having the support member 200 attached thereto, according to an embodiment. FIG. 11B is an enlarged view of a portion where the support member 200 is attached to the recess 110, according to an embodiment. Here, FIGS. 11A and 11B may represent a cross-section of the exterior cover 10 shown in FIG. 10, taken along line B-B'.

The exterior cover 10 may include a cover portion 100 and a support member attachable to or detachable from the cover portion 100. In addition, the support member 200 may be attached in various forms at various positions of the cover portion 100.

Referring again to FIG. 1, the support member 200 may be attached to the cover portion 100 while being parallel to the rear surface 102 of the plate 100a. The support member 200 may be attached to the recess 110 formed in the rear surface 102 of the cover portion 100. According to an embodiment, all the first portion (e.g., the first portion 203a of FIG. 4A), the second portion (e.g., the second portion 203b of FIG. 4A), the third portion (e.g., the third portion 203c of FIG. 4A), and the fourth portion (e.g., the fourth portion 203d of FIG. 4A) of the support member 200 may be attached to the recess 110.

Alternatively, referring to FIG. 10, the support member 200 may be attached to the recess 100 of the cover portion 100 such that only a portion of the support member 200 is attached to the recess 100. The support member 200 may have the overall shape in which the same is attached to the cover portion 100 while being perpendicular to the rear surface 102 of the plate 100a. When the support member 200 is attached to the cover portion 100 while being perpendicular to the rear surface 102 of the plate 100a, a user can easily grip the support member 200 by inserting a portion of his or her finger through the hollow portion formed through the middle portion thereof.

According to an embodiment, the third portion (e.g., the third portion 203c of FIG. 4A) of the support member 200 may be attached to the recess 110. According to another embodiment, the fourth portion (e.g., the fourth portion 203d of FIG. 4A) of the support member 200 may be attached to the recess 110. Here, the portion where the support member 200 is attached to the recess 110 may be a portion in which a magnetic material (e.g., the first magnetic material 210 of FIG. 8) is accommodated.

Referring to FIG. 11A, the metallic member 120 may be disposed on the cover portion 100 at a position overlapping the recess 110. When at least a portion of the support member 200 approaches the recess 110 overlapping the metallic member 120, the support member 200 may be attached to the recess 110 by the attractive force of the magnetic material 210 accommodated in the support member 200. The support member 200 attached to the recess 110 may remain attached to the recess 110 until an external force greater than or equal to a predetermined size is applied thereto.

Referring to FIGS. 11A and 11B together, the recess 110 may further include a recess portion 113 and a protrusion 112 formed on the periphery of the recess portion 113. The recess portion 113 may be a portion on which at least one surface of the support member 200 is stably placed. The recess portion 113 may be recessed from the plate 100a in the first direction and may correspond to a groove and/or sink structure forming a predetermined depth unlike other portions on the plate 100a. The recess portion 113 may be formed to be recessed and stepped by a predetermined depth from the plate 100a, as shown in FIGS. 11A and 11B, but is not limited thereto. The recess portion 113 may be separated from the rear 102 of the plate 100a by the protrusion 112. The protrusion 112 may be a portion protruding in the height direction around the recess portion 113.

The support member 200 may include four surfaces including two opposite surfaces and two surfaces adjacent thereto when viewed in a cross-section view, and a corner between the surface and the surface may be formed seamlessly without being angled. Here, the "cross-section of the support member" may indicate a cross-section of any one portion (e.g., the third portion 203c) of the support member. The support member 200 may include a first surface 201, a second surface 202, and two opposing side surfaces 203

Referring to FIGS. 11A and 11B together, as for the magnetic material 210, the center (C) of the third portion (e.g., third portion 203c of FIG. 4A) (or the fourth portion (e.g., the fourth portion 203d of FIG. 4A)) of the support member 200 may be disposed concentrically with the center of the magnetic material 210. One surface of the support member 200 may be maintained in a state where the same is attached to the recess 110 while being in contact with the recess portion 113 of the recess 110.

The distance from the center (C) (e.g., the center (C) of the cross-section of the third portion 203c of the support member 200) of the support member 200 to the outer surface of the support member 200 may be uniform. When the cross-section of the support member 200 has a substantially circular shape, the distance from the center (C) of the support member 200 to the outer surface of the support member 200 may be uniform. In this case, the substantially constant magnetic force of the magnetic material 210 may be formed on the outer surface of the support member 200. When the support member 200 is attached to the cover portion 100, it may not be easy for a user to attach the support member 200 to the cover portion 100 at a specific angle (e.g., 90 degrees) because of no boundary between the surfaces of the support member 200. In addition, due to the slip which may occur between the support member 200 and the cover portion 100, it may not be easy to maintain the support member 200 at a specific angle (e.g., 90 degrees) with respect to the cover portion 100.

As shown in FIGS. 11A and 11B, the support member 200 may include four surfaces facing different directions, and the four surfaces may be seamlessly connected to one another such that the distance from the center (C) (e.g., the center (C) of the cross-section of the third portion 203c of the support member 200) of the support member 200 to the outer surface of the support member 200 is not uniform. For example, the distance (a) from the center (C) of the support member 200 to one surface (e.g., the side surface 203) of the support member 200 may be formed to be smaller than the distance (b) from the center (C) of the support member 200 to the corner portion 204 of the support member 200. When the distance (a) from the center (C) of the support member 200 to one surface (e.g., the side surface 203) of the support member 200 is formed to be smaller than the distance (b) from the center (C) of the support member 200 to the corner portion 204 of the support member 200, the strength of the magnetic force acting on one surface (e.g., the side surface 203) of the support member 200 from the center (C) of the support member 200 may be greater than the strength of the magnetic force acting on the corner portion 204 of the support member 200 from the center (C) of the support member 200. When the support member 200 is viewed in a cross-section view, the support member 200 may have the circumference of the cross-section thereof forming different distances from the center of the magnetic material 210 to the edge of the support member 200, and thus the support member 200 may be prevented from being distorted from a specified angle when the support member 200 is attached to the metallic member 120 at the specific angle.

According to the embodiment shown in FIGS. 11A and 11B, the boundary between the surface and the surface of the support member 200 may be clearly distinguished, and a user can easily attach the support member 200 onto the cover portion 100 at a specific angle. For example, as shown in FIG. 11A, the support member 200 can be easily attached perpendicularly to the cover portion 100. In addition, in a state in which the support member 200 is attached perpendicularly to the cover portion 100, slip between the support member 200 and the cover portion 100 may be prevented.

Hereinafter, various use cases related to various postures of the exterior cover 10 will be described with reference to FIGS. 1, 10, and 12 to 15.

Figure 12:
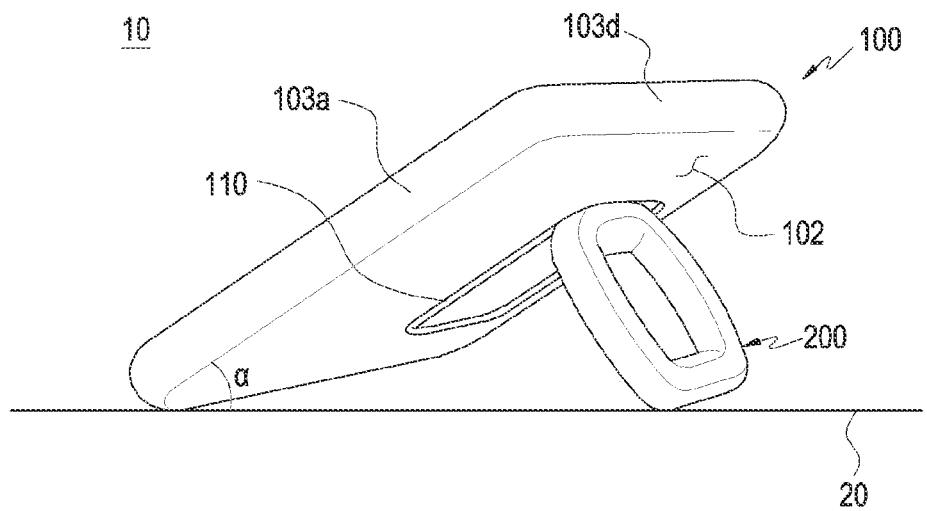
FIG. 12 is a perspective view showing a first use case of an exterior cover having a support member perpendicularly attached to a recess, according to an embodiment.
Figure 13:
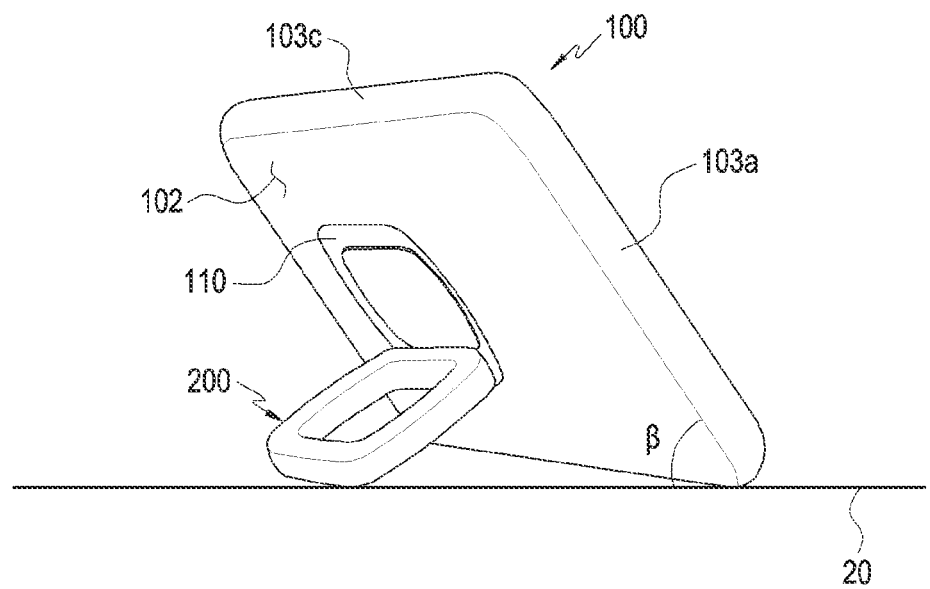
FIG. 13 is a perspective view showing a second use case of an exterior cover having a support member perpendicularly attached to a recess, according to an embodiment.

FIG. 12 is a perspective view illustrating a first use case of the exterior cover having the support member perpendicularly attached to the recess. FIG. 13 is a perspective view illustrating a second use case of the exterior cover having the support member perpendicularly attached to the recess. The embodiment in FIGS. 12 and 13 may represent a low-angle standing structure of the exterior cover.

Referring again to FIG. 1, the support member 200 may be attached to the recess 110 to be available in a direction parallel to the plate 100a. The support member 200 may be attached to the recess 100 while having the entire portion (e.g., the first portion 203a, the second portion 203b, the third portion 203c, and the fourth portion 204d) thereof in contact therewith. The embodiment shown in FIG. 1 may represent a general use case when a user grips the exterior cover 10 or moves the exterior cover 10. The support member 200 may be removed from the cover portion 100 to be available when the electronic device is wirelessly charged or cradled on a vehicle cradle.

Referring again to FIG. 10, the support member 200 may be attached to the recess 110 to be available in a direction perpendicular thereto. In this case, the support member 200 may be attached to the recess 110 while having one portion (e.g., the third portion 203c or the fourth portion 203d) in contact therewith. The embodiment shown in FIG. 10 may represent a use case when a user grips the exterior cover 10, which is different from that in FIG. 1. According to the embodiment shown in FIG. 10, the support member 200 perpendicularly attached to the cover portion 100 allows a user to insert a finger through the hollow portion of the support member 200.

FIGS. 12 and 13 may represent an embodiment in which the exterior cover is cradled with respect to the ground by using the support member 200 perpendicularly attached to the recess 110, according to various embodiments.

Herein, the ground may refer to not only the surface of the earth or the ground but also may refer to a reference surface on which the electronic device or the exterior cover 10 can be placed. For example, the ground may include a rock, a worktable, a dining table, or a car center fascia, in addition to the ground surface and the ground. In addition, the ground may not necessarily refer to only the ground parallel to the horizontal plane. The ground may also include a slightly slopping or irregular and uneven ground.

Referring to FIGS. 12 and 13 together, the support member 200 may support the cover portion 100 at various angles with respect to the ground while stably supporting the cover portion 100. Depending on a position at which the support member 200 is attached to the cover portion 100 or a direction in which the exterior cover 10 is cradled on the ground, one of a plurality of cradling modes may be selected to maintain a specified angle formed by the cover portion 100 with respect to the ground.

The plurality of cradling modes may refer to a state in which when an electronic device is used while being coupled to the exterior cover 10, an inclined angle of the electronic device formed with respect to the ground is maintained at a specific angle. In this case, the inclined angle at which the electronic device is formed with respect to the ground is an acute angle and may include a maximally vertical state.

The support member 200 may be perpendicularly attached to the recess 110 of the cover portion 100, for example, the third recess 111c or the fourth recess 111d. Referring back to FIG. 10, the center 105 of the recess 110 may be positioned at a position slightly biased to one side from the center of the rear surface 102 of the cover portion 100. In addition, the third recess 111c or the fourth recess 111d may be formed at a position slightly biased in the width direction with respect to the center 105 of the recess 110. Accordingly, when one surface of the cover portion 100 and one surface of the support member 200 are in contact with the ground in a state in which the support member 200 is perpendicularly attached to the third recess 111c or the fourth recess 111d, the exterior cover 10 may be inclined by a specific angle with respect to the ground.

Referring to FIG. 12, while the support member 200 is perpendicularly attached to the fourth recess (e.g., the fourth recess 111d of FIG. 3), when one surface (e.g., the third side surface portion 103c of FIG. 10) of the cover portion 100 is in contact with the ground 20 and one surface (e.g., the third portion 203c of FIG. 4A) of the support member 200 is in contact with the ground 20, the exterior cover 10 and the ground 20 may form an angle "a".

Referring to FIG. 13, while the support member 200 is perpendicularly attached to the fourth recess (e.g., the fourth recess 111d of FIG. 3), when the other surface (e.g., the fourth side surface portion 103d of FIG. 10) of the cover portion 100 is in contact with the ground 20 and one surface (e.g., the third portion 203c of FIG. 4A) of the support member 200 is in contact with the ground 20, the exterior cover 10 and the ground 20 may form an angle "0". The angle "p" may be greater than the angle "a".

A transition between a state in which the support member 200 is attached in parallel to the cover portion 100 (e.g., the recess 110) and a state in which the support member 200 is perpendicularly attached to the cover portion 100 (e.g., the recess 110) may be implemented by attraction between the magnetic material accommodated inside the support member 200 and the metallic member 120 disposed inside the plate 100a to overlap the recess 110. The cradling state of the support member 200 and the cover portion 100 may be variously adjusted using the invisible hinge structure.

Figure 14:
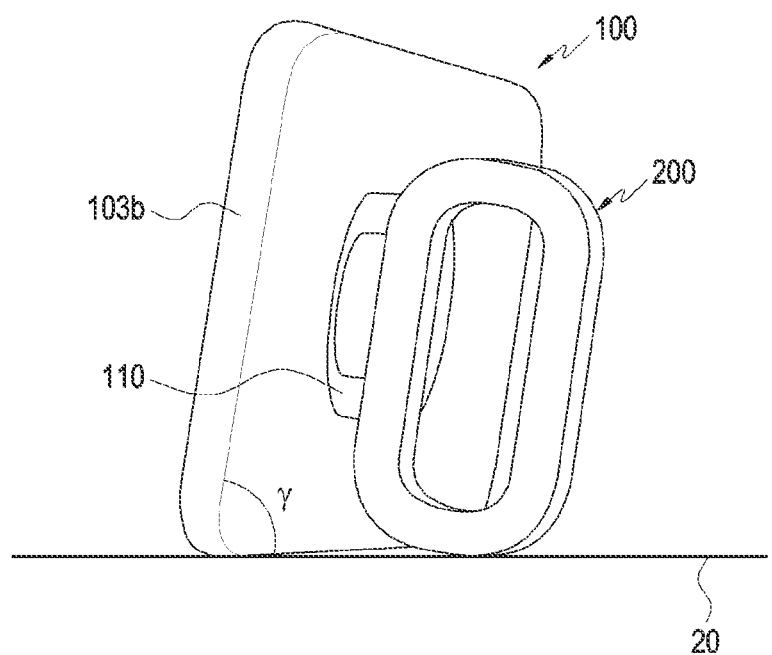
FIG. 14 is a perspective view showing a third use case of an exterior cover having a support member perpendicularly attached to a cover portion, according to an embodiment.
Figure 15:
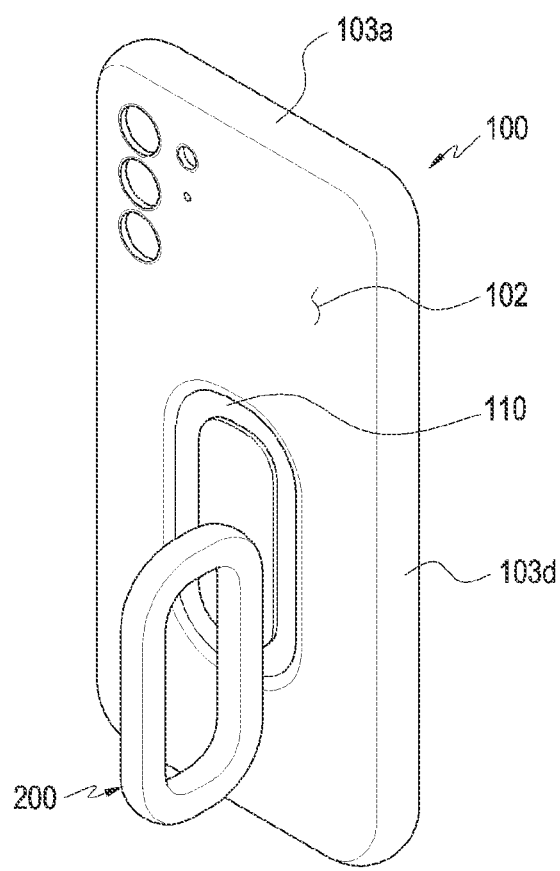
FIG. 15 is a perspective view showing a fourth use case of an exterior cover having a support member perpendicularly attached to cover portion, according to an embodiment.

FIG. 14 is a perspective view illustrating a third use case of the exterior cover having the support member perpendicularly attached to the cover portion, according to an embodiment. FIG. 15 is a perspective view illustrating a fourth use case of the exterior cover having the support member perpendicularly attached to the cover portion, according to an embodiment. The embodiment in FIGS. 14 and 15 may represent a high-angle standing structure of the exterior cover.

The support member 200 may be attached so as to be available in a direction perpendicular to another position of the cover portion 100 other than the recess 110. In this case, the support member 200 may be attached while at least a portion (e.g., the third portion 203c or the fourth portion 203d) thereof is disposed to crossing at least a portion of the recess 110. In addition, the support member 200 may be attached while being disposed to cross at least a portion of the plate 100a of the cover portion 100 except for the recess 110.

The embodiment shown in FIG. 14 may represent the support member 200 being disposed at a position corresponding to the bridge 122 shown in FIG. 6 and the third elongated portion 125 shown in FIG. 7. As shown in FIG. 6, the metallic member 120 may include a bridge 122 extending in a direction perpendicular to the longitudinal direction of the fourth recess 111d from the end of the first elongated portion 121. In addition, as shown in FIG. 7, the metallic member 120 may include a third elongated portion 125 extending in a vertical direction from one end of the first elongated portion 121.

Referring to FIG. 14, in a state in which the support member 200 is attached to cross at least a portion of the recess 110, when one surface (e.g., the third side surface portion 103c of FIG. 10) of the cover portion 100 is in contact with the ground 20 and one surface (e.g., the second portion 203b of FIG. 4A) of the support member 200 is in contact with the ground 20, the exterior cover 10 and the ground 20 may form an angle "y". The angle "y" may be greater than "s".

The embodiment shown in FIG. 15 may indicate that the support member 200 is disposed at a position corresponding to the second elongated portion 123 shown in FIG. 6. The metallic member 120 may include a second elongated portion 123 extending in a direction perpendicular to the second recess 111b from the end of the bridge 122 as shown in FIG. 6.

Referring to FIG. 15, while the support member 200 is attached to cross at least a portion (e.g., the second recess 111b) of the recess 110, when one surface (e.g., the second side surface portion 103b of FIG. 10) is in contact with the ground 20 and one surface (e.g., the second portion 203b of FIG. 4A) of the support member 200 is in contact with the ground 20, a state in which the exterior cover 10 is inclined to be substantially perpendicular to the ground 20 may be maintained.

The above-described FIGS. 12 to 15 show embodiments of some of the use cases of the support member 200 attached to the cover portion 100. The use case of the support member 200 attached to the cover portion 100 is not limited to the above-described embodiments and may be applied to various other embodiments that are applicable from the above-described embodiments.

According to various embodiments of the disclosure, a support member that is freely attached to or detachable from the cover portion may be provided as a cradling device capable of cradling the exterior cover at various angles. According to various embodiments of the disclosure, a support member having an invisible hinge structure may be provided to an exterior cover coupled to an electronic device, thereby having an advantage of providing an aesthetically pleasing sense. According to various embodiments of the disclosure, user convenience may be increased by providing a function of implementing a plurality of cradling modes to an exterior cover that is normally used in combination with an electronic device. According to various embodiments of the disclosure, a support member coupled to the rear surface of an exterior cover can support the exterior cover at various angles, and an electronic device can be stably cradled in the corresponding direction.

It should be appreciated that various embodiments of the disclosure and the terms used therein are not intended to limit the technological features set forth herein to particular embodiments and include various changes, equivalents, or alternatives for a corresponding embodiment.

With regard to the description of the drawings, similar reference numerals may be used to designate similar or relevant elements. A singular form of a noun corresponding to an item may include one or more of the items, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). If an element (e.g., a first element) is referred to as "coupled with/to" or "connected with/to" another element (e.g., a second element), it may mean that the element may be coupled/connected with/to the other element directly or indirectly via a third element.

According to various embodiments, each element of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration.

Various embodiments of the disclosure may provide an electronic device exterior cover including a cover portion (e.g., the cover portion 100 of FIG. 1) including a front surface facing in a first direction (e.g., the z-axis direction of FIG. 1), a rear surface facing in a second direction (e.g., the −z-axis direction of FIG. 1) opposite to the first direction, and a recess (e.g., the recess 110 of FIG. 1) formed on the rear surface; and a support member (e.g., the support member 200 of FIG. 1) having a shape corresponding to the recess and including a magnetic material (e.g., the magnetic material 210 of FIG. 8) accommodated therein to be detachably provided on the rear surface of the cover portion, and the cover portion may include at least one metallic member (e.g., the at least one metallic member 120 of FIG. 5) disposed inside thereof so as to at least partially overlap the recess.

According to various embodiments, the metallic member may include: a first elongated portion (e.g., the first elongated portion 121 of FIG. 5) extending in a third direction (e.g., the y-direction of FIG. 1) perpendicular to the first direction and the second direction; and a bridge (e.g., the bridge 122 of FIG. 5) extending in a fourth direction different from the third direction According to various embodiments, the metallic member may further include a second elongated portion (e.g., the second elongated portion 123 of FIG. 5) extending in the third direction parallel to the first elongated portion from one end of the bridge.

According to various embodiments, the first elongated portion may have substantially an identical width to a portion of the recess and may extend in a direction substantially identical thereto.

According to various embodiments, the magnetic material may include a magnetic material alternately multipolar magnetized in the longitudinal direction.

According to various embodiments, the support member may include: a first portion (e.g., the first portion 203a of FIG. 4A); a second portion (e.g., the second portion 203b of FIG. 4A) spaced apart from the first portion and at least partially parallel to the first portion; a third portion (e.g., the third portion 203c of FIG. 4A) extending from one end of the first portion and at least partially perpendicular to the first portion; and a fourth portion (e.g., the fourth portion 203d of FIG. 4A) extending from the other end of the first portion and at least partially parallel to the third portion, wherein the recess comprising the first recess, the second recess, the third recess and the fourth recess is configured to have an "O" shape.

According to various embodiments, the support member may include: a first portion (e.g., the first portion 203a of FIG. 4B); a third portion (e.g., the third portion 203c of FIG. 4B) extending from one end of the first portion and at least partially perpendicular to the first portion; and a fourth portion (e.g., the fourth portion 203*d* of FIG. 4B) extending from the other end of the first portion and at least partially parallel to the third portion, wherein the support member comprising the first portion, the third portion and the fourth portion is configured to have a "U" shape.

According to various embodiments, the magnetic material may include a first magnetic material (e.g., the first magnetic material 211 of FIG. 8) accommodated in the third portion of the support member.

According to various embodiments, the first magnetic material may include a rod-shaped magnet or a cylindrical magnet.

According to various embodiments, the magnetic material may include a second magnetic material (e.g., the second magnetic material 214 of FIG. 8) accommodated in the fourth portion of the support member.

According to various embodiments, the second magnetic material may include a patch-type magnet.

According to various embodiments, when the support member is viewed in cross-section, a distance from the center of the support member to one surface of the support member may be smaller than a distance from the center of the support member to a corner portion of the support member.

According to various embodiments, the recess may include: a first recess (e.g., the first recess 111*a* of FIG. 2B); a second recess (e.g., the second recess 111*b* of FIG. 2B) spaced apart from the first recess and formed to face in a direction at least partially parallel to the first recess; a third recess (e.g., the third recess 111*c* of FIG. 2B) extending from one end of the first recess and at least partially perpendicular to the first recess; and a fourth recess (e.g., the fourth recess 111*d* of FIG. 2B) extending from the other end of the first recess and facing in a direction at least partially parallel to the third recess, wherein the recess comprising the first recess, the second recess, the third recess and the fourth recess is configured to have an "O" shape.

According to various embodiments, the recess may include: a first recess; a third recess extending from one end of the first recess and at least partially perpendicular to the first recess; and a fourth recess extending from the other end of the first recess and facing in a direction at least partially parallel to the third recess, wherein the recess comprising the first recess, the third recess and the fourth recess is configured to have a "U" shape.

According to various embodiments, the recess may include a recess portion (e.g., the recess portion 113 of FIG. 11B) and a protrusion (e.g., the protrusion 112 of FIG. 11B) formed on the periphery of the recess portion.

Various embodiments of the disclosure may provide an electronic device exterior cover (e.g., the exterior cover 10 of FIG. 1) including: a cover portion (e.g., the cover portion 100 of FIG. 1) including a recess (e.g., the recess 110 of FIG. 1) formed in at least a portion of the surface thereof and a metallic member disposed to at least partially overlap the recess; and a support member (e.g., the support member 200 of FIG. 1) including at least one magnetic material (e.g., the at least one magnetic material 210 of FIG. 8) accommodated therein to be detachably provided on the rear surface of the cover portion, the recess may include: a first recess (e.g., the first recess 111*a* of FIG. 2B); a third recess (e.g., the third recess 111*c* of FIG. 2B) extending from one end of the first recess and at least partially perpendicular to the first recess; and a fourth recess (e.g., the fourth recess 111*d* of FIG. 2B) extending from the other end of the first recess and facing in a direction at least partially parallel to the third recess, and the support member may include: a first portion (e.g., the first portion 203*a* of FIG. 3); a third portion (e.g., the third portion 203*c* of FIG. 3) extending from one end of the first portion and at least partially perpendicular to the first portion; and a fourth portion (e.g., the fourth portion 203*d* of FIG. 3) extending from the other end of the first portion and at least partially parallel to the third portion, thereby having a shape corresponding to the recess.

According to various embodiments, the metallic member may include: a first elongated portion (e.g., the first elongated portion 121 of FIG. 5) extending in a third direction (e.g., the y-axis direction of FIG. 1) perpendicular to a first direction (e.g., the z-axis direction of FIG. 1) toward which the front surface of the cover portion faces and a second direction (e.g., the −z-axis direction of FIG. 1) toward which the rear surface of the cover portion faces; a second elongated portion (e.g., the second elongated portion 123 of FIG. 5) spaced apart from the first elongated portion by a predetermined distance and extending in the third direction parallel to the first elongated portion; and a bridge (e.g., the bridge 124 of FIG. 5) extending in a fourth direction different from the third direction to connect one end of the first elongated portion and one end of the second elongated portion to each other.

According to various embodiments, the exterior cover may further include a second metallic member (e.g., the second metallic member 124 of FIG. 5) spaced apart from the metallic member and disposed to at least partially overlap the recess.

According to various embodiments, the recess may further include a second recess (e.g., the second recess 111*b* of FIG. 2B) spaced apart from the first recess and formed to face in a direction at least partially parallel to the first recess.

According to various embodiments, the support member may further include a second portion (e.g., the second portion 111*b* of FIG. 3) spaced apart from the first portion and at least partially parallel to the first portion.

The embodiments disclosed in the disclosure are provided for explanation and understanding of the technical content, and do not limit the scope of the disclosed technology. While the present disclosure has been described with reference to various embodiments, various changes may be made without departing from the spirit and the scope of the present disclosure, which is defined, not by the detailed description and embodiments, but by the appended claims and their equivalents. Accordingly, the scope of the disclosure should be construed to include all modifications or various other embodiments based on the technical spirit of the disclosure.

What is claimed is:

1. An exterior cover of an electronic device, the exterior cover comprising:
   a cover portion comprising a front surface facing in a first direction, a rear surface facing in a second direction opposite to the first direction, and a recess formed on the rear surface; and
   a support member having a shape corresponding to the recess and comprising a magnetic material accommodated therein to be detachably provided on the rear surface of the cover portion,
   wherein the cover portion further comprises at least one metallic member disposed inside thereof,
   wherein the at least one metallic member at least partially overlaps the recess, and
   wherein the recess comprises:
   a first recess;
   a third recess extending from one end of the first recess and at least partially perpendicular to the first recess; and a fourth recess extending from the other end of the first recess and facing in a direction at least partially parallel to the third recess.

2. The exterior cover of claim 1, wherein the metallic member comprises:
a first elongated portion extending in a third direction perpendicular to the first direction and the second direction; and
a bridge extending in a fourth direction different from the third direction.

3. The exterior cover of claim 2, wherein the metallic member further comprises a second elongated portion extending in the third direction parallel to the first elongated portion from one end of the bridge.

4. The exterior cover of claim 2, wherein the first elongated portion has substantially an identical width to a portion of the recess and extends in a direction substantially identical thereto.

5. The exterior cover of claim 1, wherein the magnetic material is alternately multipolar magnetized in the longitudinal direction.

6. The exterior cover of claim 1, wherein the support member comprises:
a first portion;
a second portion spaced apart from the first portion and at least partially parallel to the first portion;
a third portion extending from one end of the first portion and at least partially perpendicular to the first portion; and
a fourth portion extending from the other end of the first portion and at least partially parallel to the third portion, and
wherein the support member comprising the first portion, the second portion, the third portion and the fourth portion is configured to have an "O" shape.

7. The exterior cover of claim 6, wherein the magnetic material comprises a first magnetic material accommodated in the third portion of the support member.

8. The exterior cover of claim 7, wherein the first magnetic material comprises a rod-shaped magnet or a cylindrical magnet.

9. The exterior cover of claim 6, wherein the magnetic material comprises a second magnetic material accommodated in the fourth portion of the support member.

10. The exterior cover of claim 9, wherein the second magnetic material comprises a patch-type magnet.

11. The exterior cover of claim 1, wherein the support member comprises: a first portion;
a third portion extending from one end of the first portion and at least partially perpendicular to the first portion; and
a fourth portion extending from the other end of the first portion and at least partially parallel to the third portion,
wherein the support member comprising the first portion, the third portion and the fourth portion is configured to have a "U" shape.

12. The exterior cover of claim 1, wherein when a cross-section of the support member is viewed,
a distance from the center of the support member to one surface of the support member is smaller than a distance from the center of the support member to a corner portion of the support member.

13. The exterior cover of claim 1, wherein the recess comprises:

a second recess spaced apart from the first recess and formed to face in a direction at least partially parallel to the first recess;
wherein the recess comprising the first recess, the second recess, the third recess and the fourth recess is configured to have an "O" shape.

14. The exterior cover of claim 1, wherein
the recess comprising the first recess, the third recess and the fourth recess is configured to have a "U" shape.

15. The exterior cover of claim 1, wherein the recess comprises a recess portion and a protrusion formed on the periphery of the recess portion.

16. An exterior cover of an electronic device, the exterior cover comprising:
a cover portion comprising a recess formed in at least a portion of a surface thereof and a first metallic member disposed to at least partially overlap the recess; and
a support member comprising at least one magnetic material accommodated therein to be detachably provided on the rear surface of the cover portion,
wherein the recess comprises:
a first recess;
a third recess extending from one end of the first recess and at least partially perpendicular to the first recess; and
a fourth recess extending from the other end of the first recess and facing in a direction at least partially parallel to the third recess, and
wherein the support member further comprises:
a first portion;
a third portion extending from one end of the first portion and at least partially perpendicular to the first portion; and
a fourth portion extending from the other end of the first portion and at least partially parallel to the third portion, and
wherein the support member is configured to have a shape corresponding to the recess.

17. The exterior cover of claim 16, wherein the first metallic member comprises:
a first elongated portion extending in a third direction perpendicular to a first direction toward which the front surface of the cover portion faces and a second direction toward which a rear surface of the cover portion faces;
a second elongated portion spaced apart from the first elongated portion by a predetermined distance and extending in the third direction parallel to the first elongated portion; and
a bridge extending in a fourth direction different from the third direction to connect one end of the first elongated portion and one end of the second elongated portion to each other.

18. The exterior cover of claim 16, further comprising a second metallic member spaced apart from the first metallic member and disposed to at least partially overlap the recess.

19. The exterior cover of claim 16, wherein the recess further comprises a second recess spaced apart from the first recess and formed to face in a direction at least partially parallel to the first recess.

20. The exterior cover of claim 19, wherein the support member further comprises a second portion spaced apart from the first portion and at least partially parallel to the first portion.

* * * * *